US011962855B1

(12) United States Patent
Topchy et al.

(10) Patent No.: US 11,962,855 B1
(45) Date of Patent: Apr. 16, 2024

(54) METHODS, APPARATUS, AND ARTICLES OF MANUFACTURE TO DETERMINE WHETHER AUDIENCE MEASUREMENT METERS ARE CO-LOCATED

(71) Applicant: The Nielsen Company (US), LLC, New York, NY (US)

(72) Inventors: Alexander Topchy, New Port Richey, FL (US); Ronny Lerch, San Antonio, FL (US); John Stavropoulos, Edison, NJ (US); David Gish, Riverdale, NJ (US)

(*) Notice: Subject to any disclaimer, the term of this patent is extended or adjusted under 35 U.S.C. 154(b) by 25 days.

(21) Appl. No.: 17/977,887

(22) Filed: Oct. 31, 2022

(51) Int. Cl.
*H04N 21/45* (2011.01)
*H04N 21/466* (2011.01)

(52) U.S. Cl.
CPC ..... *H04N 21/4661* (2013.01); *H04N 21/4532* (2013.01)

(58) Field of Classification Search
CPC .............. H04N 21/4532; H04N 21/4661
See application file for complete search history.

(56) References Cited

U.S. PATENT DOCUMENTS

| 8,508,357 | B2 | 8/2013 | Srinivasan et al. | |
| 8,938,211 | B2 | 1/2015 | Das et al. | |
| 10,878,442 | B1* | 12/2020 | Lewis | G06Q 30/0241 |
| 11,490,278 | B1* | 11/2022 | LeJeune, Jr. | H04W 24/08 |
| 2008/0143604 | A1* | 6/2008 | Mock | G08B 13/2462 |
| | | | | 342/450 |
| 2014/0274144 | A1* | 9/2014 | Des Jardins | H04N 21/47202 |
| | | | | 455/456.3 |
| 2015/0207701 | A1* | 7/2015 | Faaborg | H04L 67/52 |
| | | | | 709/224 |
| 2017/0272824 | A1* | 9/2017 | Bunner | H04N 21/8586 |
| 2018/0239932 | A1* | 8/2018 | Gummeson | H04W 12/08 |
| 2020/0005557 | A1* | 1/2020 | Madaan | G06Q 50/40 |
| 2022/0113401 | A1* | 4/2022 | Axley | G01S 7/0236 |

OTHER PUBLICATIONS

Wikipedia, "Beacon Frame," last edited Nov. 20, 2020, retrieved from https://en.wikipedia.org/w/index.php?title=Beacon_frame &oldid=989762788, 3 pages.

(Continued)

*Primary Examiner* — Hsiungfei Peng
*Assistant Examiner* — Fred Peng

(57) ABSTRACT

Methods, apparatus, systems, and articles of manufacture are disclosed to determine whether audience measurement meters are co-located. An example apparatus is to, based on a difference between a first sampling time of a first entry of a first log and a second sampling time of a corresponding entry of a second log satisfying a first threshold, determine at least one matching instance of at least one first device identifier of the first entry and at least one second device identifier of the corresponding entry. Additionally, the example apparatus is to populate a variable with the at least one matching instance. The example apparatus is also to, based on a metric satisfying a second threshold, cause transmission of an alert indicating that a first meter and a second meter were co-located during generation of the first log and the second log, the metric based on the at least one matching instance.

20 Claims, 9 Drawing Sheets

(56) References Cited

OTHER PUBLICATIONS

Wikipedia, "Bluetooth low energy beacon," last edited Jan. 4, 2021, retrieved from https://en.wikipedia.org/w/index.php?title=Bluetooth_low_energy_beacon&oldid=998169451, 8 pages.

Google Play, "Bluetooth signal strength meter," accessed Feb. 12, 2021, produced by Edgar Garcia Leyva, retrieved from https://play.google.com/store/apps/details?id=dev.egl.com.intensidadbluetooth&hl=en_US&gl=US, 5 pages.

Google Play, "FIND3—WiFi+Bluetooth based local GPS," accessed May 15, 2021, produced by Hypercube Platforms, retrieved from https://play.google.com/store/apps/details?id=com.internalpositioning.find3.find3app&hl=en_US&gl=US, 4 pages.

Adam Hernod Olevall et al., "Indoor Navigation And Personal Tracking System Using Bluetooth Low Energy Beacons," dated Oct. 2017, in conjuncture with Uppsala Universitet, 79 pages.

Blackstone, "Understanding the different types of BLE Beacons," last updated Mar. 24, 2015, retrieved from https://os.mbed.com/blog/entry/BLE-Beacons-URIBeacon-AltBeacons-iBeacon/, 7 pages.

Google Play, "WiFi signal strength meter," accessed Feb. 12, 2021, produced by Edgar Garcia Leyva, retrieved from https://play.google.com/store/apps/details?id=dev.egl.com.intensidadwifi&hl=en_US&gl=US, 5 pages.

"Proximity Detection to Reveal a Consumer's Shopping Pattern/Path and Purchases made in store," dated Jan. 30, 2012, 4 pages.

Bonnington, "How Google Uses Wi-Fi Networks to Figure Out You Exact Location," The Slate Group, a Graham Holdings Company, Jun. 20, 2018, retrieved from https://slate.com/technology/2018/06/how-google-uses-wi-fi-networks-to-figure-out-your-exact-location.html, 5 pages.

* cited by examiner

METHODS, APPARATUS, AND ARTICLES OF MANUFACTURE TO DETERMINE WHETHER AUDIENCE MEASUREMENT METERS ARE CO-LOCATED

FIELD OF THE DISCLOSURE

This disclosure relates generally to audience measurement and, more particularly, to methods, apparatus, and articles of manufacture to determine whether audience measurement meters are co-located.

BACKGROUND

Media providers and/or other entities such as advertising companies, broadcast networks, etc., are often interested in the viewing, listening, and/or media behavior of audience members and/or the public in general. Audience measurement entities (AMEs) collect audience measurement information from panelists (e.g., individuals who agree to be monitored by an AME) including the number of unique audience members for particular media. The media usage and/or exposure habits of monitored audience members, as well as demographic data about the audience members, are collected and used to statistically determine the size and/or demographics of an audience of interest. To determine the media usage and/or exposure habits of monitored audience members, interested entities may need to determine the number of persons present at a media device during a media presentation by that media device.

Figure 1:
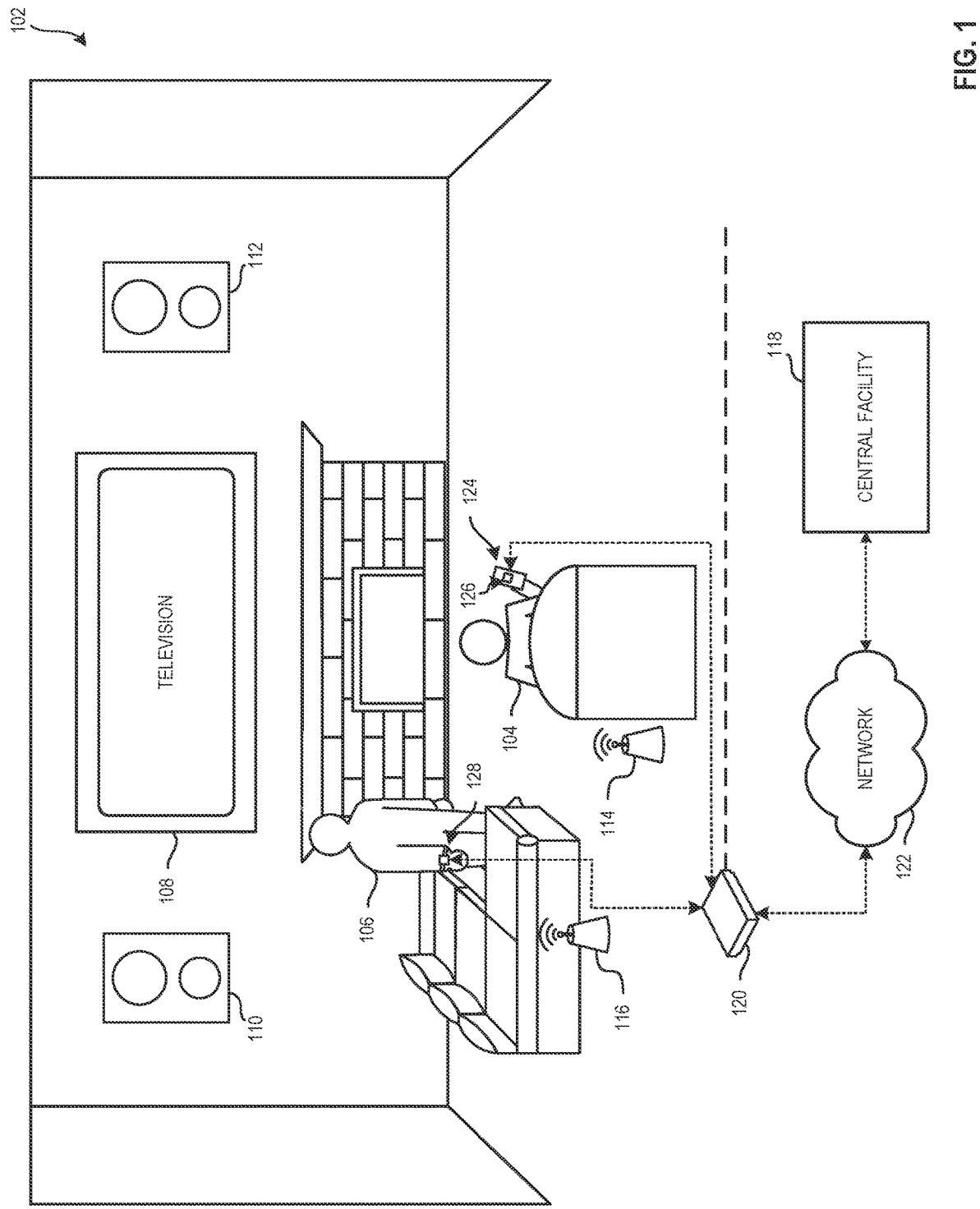
FIG. 1 is an illustration of an example media presentation environment including an example colocation detection system constructed in accordance with the teachings of this disclosure to determine whether audience measurement meters are co-located.

In general, the same reference numbers will be used throughout the drawing(s) and accompanying written description to refer to the same or like parts. The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s). In some examples, an ASIC is referred to as application specific integrated circuitry.

DETAILED DESCRIPTION

AMEs usually collect large amounts of audience measurement information from their panelists to derive audience measurement metrics including the unique audience size for particular media. As such, because data collected from a measurement panel of an AME underlies the resultant audience measurement metrics, the accuracy and integrity of that data is of paramount importance to the AME and clients of AME. To facilitate the gathering of accurate and reliable audience measurement information, some AMEs utilize audience measurement meters. For example, audience measurement meters include people meters that are placed in a media presentation environment to monitor one or more audience members, personal people meters (PPMs) that a panelist wears on his or her body, streaming meters that monitor Internet activity of one or more panelists, etc. PPMs were originally designed as devices that resembled wearable pagers. In recent years, some PPMs have been redesigned to align with current trends in wearable technology. Such PPMs are referred to as wearable meters. Wearable meters include PPMs designed as pendants, wristbands, clips, etc.

In some examples, an AME may enroll two or more members of a household (e.g., spouses) as panelists such that each of the two or more members of the household is a panelist of the AME (e.g., a "Nielsen family"). In such examples, each of the two or more panelists may be assigned a wearable meter or another PPM (referred to herein as "meter(s)"). However, the miniaturization and increased portability of wearable meters presents a risk that two or more meters can be worn/carried by the same panelist. Instances when one panelist carries two or more meters at the same time are referred to herein as duplicate wear. Such instances of duplicate wear are not compliant with panelist participation in a measurement panel because, for example, duplicate wear leads to inaccurate and/or unreliable audience measurement information. For example, when duplicate wear occurs, two or more impressions will be recorded for media detected by the duplicate-worn meters when only one person was exposed to the media.

AMEs implement many techniques to identify non-compliant panelists (e.g., as a result of one or more instances of duplicate wear). One technique utilizes built-in accelerometers on meters to generate respective motion metrics (sometimes referred to as motion signatures) for the meters. For example, a motion metric is computed for each meter in a panelist household and compared among meters that are suspected of being worn by the same panelist. However, such motion signatures are coarse measurements and lack sufficient granularity to accurately detect duplicate wear in some scenarios. For examples, if a panelist wears one meter in a first manner (e.g., on his or her wrist) and carries another meter differently (e.g., in his or her pocket), techniques utilizing motion signatures may not be able to detect duplicate wear. Additionally, techniques utilizing motion signatures are highly dependent on the activity of panelists and may require multiple combinations of reference duplicate wear to detect duplicate wear by panelists. For example, a motion signature of a wearable meter may be different when the wearable meter is worn on the left wrist versus the right wrist. As such, if two or more meters are worn by the same person and there is little correlation between the motion of the two or more meters, then motion signatures may not indicate the duplicate wear.

Examples disclosed herein include methods, apparatus, and articles of manufacture to determine whether audience measurement meters are co-located. Disclosed examples utilize detected radio frequency (RF) signals from one or more devices in a monitoring environment to determine whether two or more meters are co-located on the same panelist. For example, disclosed examples include utilizing the detected presence of nearby Bluetooth® devices and/or Wi-Fi® devices to determine whether two or more meters are co-located on the same panelist. In examples disclosed herein, utilizing the presence of Bluetooth® Low Energy (BLE) devices is preferred as BLE signals propagate much shorter distances than other RF signals and can better co-locate end-user devices (e.g., wearable meters). In additional or alternative examples, the presence of other RF devices may be used without departing from examples disclosed herein.

FIG. 1 is an illustration of an example media presentation environment 102 including an example colocation detection system constructed in accordance with the teachings of this disclosure to determine whether audience measurement meters are co-located. In the illustrated example of FIG. 1, the example media presentation environment 102 includes example panelists 104, 106, an example media presentation device 108 that receives and presents media from an example media source (not shown), an example first speaker 110, an example second speaker 112, an example first RF beacon 114, and an example second RF beacon 116. In the example of FIG. 1, the first RF beacon 114 and/or the second RF beacon 116 (e.g., one or more Nielsen home beacons) generate one or more signals that allow one or more end-user devices in the media presentation environment 102 to detect the presence of the first RF beacon 114 and/or the second RF beacon 116. For example, one or more end-user devices, such as audience measurement meters (e.g., wearable meter and/or other PPMs), in the media presentation environment 102 generate device detection logs (sometimes referred to as device detection profiles) based on one or more device detection signals emitted by the first RF beacon 114 and/or the second RF beacon 116. The one or more end-user devices report example device detection logs to an example central facility 118 via an example gateway 120 and an example network 122. The example central facility 118 analyzes one or more device detection logs to determine whether two or more end-user devices (e.g., meters) are co-located on one of the panelists 104, 106.

While the example of FIG. 1 illustrates and describes the first RF beacon 114 and/or the second RF beacon 116 as RF beacons, it should be understood that examples disclosed herein are not limited to RF beacons. On the contrary, many different RF devices could be utilized in conjunction with examples disclosed herein. For example, in addition to or as an alternative to RF beacons, examples disclosed herein may utilize Bluetooth keyboards, Bluetooth headsets, smartphones, smart speakers, televisions (TVs), personal computers (PCs), and/a myriad of other devices. For purposes of clarity, the second RF beacon 116 will not be discussed further herein. In some examples, such as when the description of the second RF beacon 116 differs from the description of the first RF beacon 114, the second RF beacon 116 is discussed further herein. However, any of the description and/or illustration of solely the first RF beacon 114 should be understood to similarly apply to the second RF beacon 116.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the media presentation device 108, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media presentation device 108 is a television. However, the example media presentation device 108 can correspond to any type of audio, video and/or multimedia presentation device capable of presenting media audibly and/or visually. In the illustrated example of FIG. 1, the media presentation device 108 is in communication with the first speaker 110 and the second speaker 112. In some examples, the media presentation device 108 (e.g., a television) may communicate audio to another media presentation device (e.g., an audio/video receiver) for output by the first speaker 110 and/or the second speaker 112 (e.g., surround sound speakers, a sound bar, etc.). As another example, the media presentation device 108 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media presentation device 108 receives media from a media source (not illustrated). The media source may be any type of media provider(s), such as, but not limited to, a cable media service provider, an RF media provider, an Internet based provider (e.g., IPTV), a satellite media service provider, etc., and/or any combination thereof. The media may be radio media, television media, pay per view media, movies, Internet Protocol Television (IPTV), satellite TV, Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media presentation device 108 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source, etc., is also typically included in the media.

In examples disclosed herein, an AME provides the first RF beacon 114 and the second RF beacon 116 to the panelists 104, 106 (or household of panelists) such that the first RF beacon 114 and/or the second RF beacon 116 may be installed in the media presentation environment 102. In some examples, the first RF beacon 114 and/or the second RF beacon 116 is installed by the panelists 104, 106 by powering the first RF beacon 114 and/or the second RF beacon 116 and placing the first RF beacon 114 and/or the second RF beacon 116 in the media presentation environment 102.

In the illustrated example of FIG. 1, the first RF beacon 114 is implemented by a Nielsen home beacon. For example, the first RF beacon 114 includes one or more transmitters and one or more general purpose semiconductor-based electrical circuits programmed with instructions to perform specific operations and including one or more semiconductor-based logic devices (e.g., electrical hardware implemented by one or more transistors). In some examples, the one or more transmitters are implemented by one or more transceivers. In additional or alternative examples, the first RF beacon 114 is implemented by processor circuitry, analog circuit(s), digital circuit(s), logic circuit(s), programmable processor(s), programmable microcontroller(s), GPU(s), DSP(s), ASIC(s), PLD(s) and/or FPLD(s) such as FPGAs.

In the illustrated example of FIG. 1, the first RF beacon 114 transmits a device detection signal into the media presentation environment 102. In examples disclosed herein, a device detection signal includes an identifier of the device that transmitted the device detection signal. As such, multiple device detection signals include respective device identifiers of the one or more devices that transmitted the multiple device detection signals.

In the illustrated example of FIG. 1, the first RF beacon 114 transmits a device detection signal into the media presentation environment 102 as a Bluetooth® Low Energy (BLE) signal. Because BLE signal strength decreases rapidly (as compared to other RF signals) with distance from the source, examples disclosed herein advantageously allow for better detection of two or more co-located end-user devices. However, in other examples, the first RF beacon 114 may transmit the device detection signal into the media presentation environment 102 as any other RF signal (e.g., a Wi-Fi® signal).

In the illustrated example of FIG. 1, the panelist 104 is holding and/or otherwise operating an example first wireless device 124. In the example of FIG. 1, the first wireless device 124 is implemented by a meter including at least network interface circuitry and one or more general purpose semiconductor-based electrical circuits programmed with instructions to perform specific operations and including one or more semiconductor-based logic devices (e.g., electrical hardware implemented by one or more transistors). In some examples, the first wireless device 124 is implemented by processor circuitry, analog circuit(s), digital circuit(s), logic circuit(s), programmable processor(s), programmable microcontroller(s), GPU(s), DSP(s), ASIC(s), PLD(s) and/or FPLD(s) such as FPGAs. In the example of FIG. 1, the first wireless device 124 is implemented by a meter including example colocation monitoring circuitry 126.

In the illustrated example of FIG. 1, the panelist 106 is wearing and/or otherwise operating an example second wireless device 128 including at least network interface circuitry and one or more general purpose semiconductor-based electrical circuits programmed with instructions to perform specific operations and including one or more semiconductor-based logic devices (e.g., electrical hardware implemented by one or more transistors). In some examples, the second wireless device 128 is implemented by processor circuitry, analog circuit(s), digital circuit(s), logic circuit(s), programmable processor(s), programmable microcontroller(s), GPU(s), DSP(s), ASIC(s), PLD(s) and/or FPLD(s) such as FPGAs. In the example of FIG. 1, the second wireless device 128 is implemented by a wearable meter designed to appear as a smart watch.

In the illustrated example of FIG. 1, as described above, the colocation monitoring circuitry 126 includes the example colocation monitoring circuitry 126. Additionally, the second wireless device 128 includes example colocation monitoring circuitry. In the example of FIG. 1, the colocation monitoring circuitry of the second wireless device 128 is not illustrated for the sake of clarity in the drawings. As such, the colocation monitoring circuitry of the second wireless device 128 will not be discussed further herein. In some examples, such as when the description of the colocation monitoring circuitry of the second wireless device 128 differs from the description of the colocation monitoring circuitry 126, the colocation monitoring circuitry of the second wireless device 128 is discussed further herein. However, any of the description and/or illustration of solely the colocation monitoring circuitry 126 should be understood to similarly apply to the colocation monitoring circuitry of the second wireless device 128.

Figure 2:
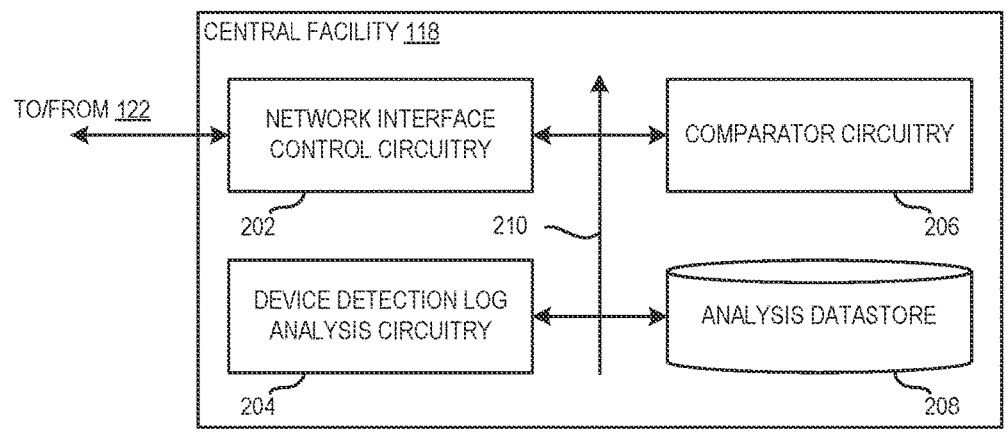
FIG. 2 is a block diagram of the example central facility of FIG. 1 to determine whether two end-user devices are co-located

In the illustrated example of FIG. 1, the colocation monitoring circuitry 126 scans the media presentation environment 102 for one or more device detection signals. For example, RF devices in the media presentation environment 102 announce themselves utilizing device detection signals. In the example of FIG. 2, the colocation monitoring circuitry 126 scans the media presentation environment 102 for at least one Bluetooth® Low Energy device that is in discoverable mode. In discoverable mode, BLE devices announce themselves via advertising packets. For BLE devices, device detection signals include advertising packets. In this manner, the colocation monitoring circuitry 126 can detect the presence of one or more BLE devices in the media presentation environment 102. In additional or alternative examples, the colocation monitoring circuitry 126 scans the media presentation environment 102 for one or more beacon frames to detect one or more Wi-Fi® devices. For Wi-Fi® devices, device detection signals include beacon frames. In some examples, the colocation monitoring circuitry 126 utilizes a low energy implementation of the Wi-Fi 6 standard.

In the illustrated example of FIG. 1, the colocation monitoring circuitry 126 determines device identifiers corresponding to devices that transmitted device detection signals. For example, the device identifiers include the names of the devices that transmitted device detection signals. In this manner, the colocation monitoring circuitry 126 detects the names of nearby devices and compile a list of the names at each scan of the media presentation environment 102.

In the illustrated example of FIG. 2, the colocation monitoring circuitry 126 scans the media presentation environment 102 periodically. For example, after a monitoring interval passes, the colocation monitoring circuitry 126 scans the media presentation environment 102. In the example of FIG. 2, the monitoring interval is five minutes. In additional or alternative examples, the monitoring interval may be a longer or shorter period of time. For each scan, the colocation monitoring circuitry 126 records a sampling time for the scan. The lists of detected device identifiers are stored in a device detection log. An example device detection log includes one or more entries where each entry includes a timestamp reflecting the sampling time for a corresponding scan and one or more device identifiers corresponding to one or more devices that transmitted one or more device detection signals during the corresponding scan.

In the illustrated example of FIG. 1, the colocation monitoring circuitry 126 transmits the device detection log to the central facility 118 for analysis. For example, the central facility 118 determines whether the first wireless device 124 is co-located on the panelist 104 with another end-user device. To improve confidence in analysis conducted by the central facility 118, the colocation monitoring circuitry 126 conducts a threshold number of scans. For example, the threshold number of scans corresponds to several hours. Additionally, to improve confidence in analysis conducted by the central facility 118, the colocation monitoring circuitry 126 determines whether the signal strength of detection signals satisfies a threshold. In this manner, the colocation monitoring circuitry 126 logs those devices that are nearby (e.g., within a threshold distance) for each scan.

In some examples, the colocation monitoring circuitry 126 determines whether the first wireless device 124 is co-located with another end-user device on the panelist 104. For example, another end-user device may transmit a corresponding device detection log to the first wireless device 124 for analysis by the colocation monitoring circuitry 126. In some examples, the colocation monitoring circuitry 126 communicates with a central hub (e.g., another meter in the media presentation environment 102 such as a streaming meter and/or a people meter) that collects communications from devices (e.g., the first wireless device 124 and/or the second wireless device 128) in the media presentation environment 102 and determines whether the devices are co-located. In additional or alternative examples, the central hub forwards one or more communications from the devices to the central facility 118. In some examples, one or more end-user devices in the media presentation environment 102 operate as a mesh to determines whether the one or more end-user devices are co-located.

In the illustrated example of FIG. 1, the example gateway 120 is implemented by a router that enables the first wireless device 124, the second wireless device 128, and/or other devices in the media presentation environment 102 (e.g., the media presentation device 108) to communicate with the network 122 (e.g., the Internet). In some examples, the example gateway 120 includes gateway functionality such as modern capabilities. In some other examples, the example gateway 120 is implemented in two or more devices (e.g., a router, a modem, a switch, a firewall, etc.). The gateway 120 of the illustrated example may communicate with the network 122 via Ethernet, a digital subscriber line (DSL), a telephone line, a coaxial cable, a USB connection, a Bluetooth® connection, any wireless connection, etc.

In some examples, the example gateway 120 hosts a Local Area Network (LAN) for the media presentation environment 102. In the illustrated example, the LAN is a wireless local area network (WLAN), and allows the first RF beacon 114, the second RF beacon 116, the first wireless device 124, the second wireless device 128, etc., to transmit and/or receive data via the Internet. Alternatively, the gateway 120 may be coupled to such a LAN. In examples disclosed herein, the example gateway 120 and/or connectivity to the Internet via the gateway 120 is provided by the panelists 104, 106. That is, the example gateway 120 is a device that is owned and/or operated by the panelists 104, 106, and is not provided by the AME. In some examples, the example gateway 120 may be provided by an Internet Service Provider (ISP) to facilitate communication between the LAN provided by the gateway 120 and the network 122 (e.g., the Internet). In examples disclosed herein, the first wireless device 124 and the second wireless device 128 utilize the LAN hosted by the example gateway 120 to transmit information to and/or receive information from the central facility 118. In some examples, the first RF beacon 114 and the second RF beacon 116 also utilize the LAN hosted by the example gateway 120 to transmit information to and/or receive information from the central facility 118.

In the illustrated example of FIG. 1, the network 122 is implemented by a wide area network (WAN) such as the Internet. However, in some examples, local networks may additionally or alternatively be used. Moreover, the example network 122 may be implemented using any type of public or private network such as, but not limited to, the Internet, a telephone network, a local area network (LAN), a cable network, and/or a wireless network, or any combination thereof.

In the illustrated example of FIG. 1, the central facility 118 compares device detection logs from end-user devices in the media presentation environment 102 to determine whether two or more of the end-user devices are co-located. For example, the central facility 118 determines whether a difference between the sampling times of corresponding entries of device detection logs for a pair of devices satisfies (e.g., is less than or equal to) a synchronization error threshold. In the example of FIG. 1, the synchronization error threshold is five minutes. In additional or alternative examples, other periods of time may be used for the synchronization error threshold. In some examples, the synchronization error threshold is trained using artificial intelligence. In examples disclosed herein, the synchronization error threshold is meant to compensate for minor differences in sampling time. For example, due to minor differences in sampling times and/or different locations of end-user devices, sampling times of two end-user devices may not be perfectly synchronized.

In the illustrated example of FIG. 1, if the central facility 118 determines that the difference between the sampling times of corresponding entries of the device detection logs satisfies the synchronization error threshold, the central facility 118 determines matching and non-matching instances of first device identifiers and second device identifiers of the corresponding entries. In examples disclosed herein, multiple techniques may be utilized to determine matching and non-matching instances of device identifiers in corresponding entries of device detection logs from at least two end-user devices.

In the illustrated example of FIG. 1, a device detection log may be formatted as a M×N matrix where each of the N columns corresponds to a scan performed by an end-user device (e.g., a meter) and the M rows correspond to information collected during the corresponding scan. For example, one row corresponds to a sampling time of the scan and M−1 rows correspond to device identifiers of device detection signals detected by the end-user device during the corresponding scan. For example, Table 1 and Table 2 illustrate two example device detection logs.

TABLE 1

| Time: | Mar. 14, 2021 14:15 | Mar. 14, 2021 14:25 | Mar. 14, 2021 14:30 | Mar. 14, 2021 14:45 |
|---|---|---|---|---|
| End-User Device 1 | Beagle81 Telos_ab CleoHome | Beagle81 Telos_ab CleaoHome | CleoHome | Publix245 officeNorth7 |

TABLE 2

| Time: | Mar. 14, 2021 14:14 | Mar. 14, 2021 14:26 | Mar. 14, 2021 14:31 | Mar. 14, 2021 14:47 |
|---|---|---|---|---|
| End-User Device 2 | Telos_ab CleoHome | Beagle81 Telos_ab CleaoHome | Telos_ab CleoHome | Publix245 officeNorth7 |

As illustrated in Table 1 and Table 2, each entry of the device detection logs includes respective sampling times indicative of respective monitoring intervals and respective device identifiers of at least one radio frequency device detected by the end-user devices during the respective monitoring intervals. In the example of FIG. 1, the central facility 118 populates a candidate colocation count variable with the matching instances. For example, the candidate colocation count variable corresponds to a pair of end-user devices and may be represented as an M−1×N matrix where each of the N columns corresponds to scans performed by the pair of end-user devices and the M−1 rows include respective values indicative of whether corresponding devices identifiers collected by the pair of devices matched.

In the illustrated example of FIG. 1, if the central facility 118 determines that the difference between the sampling times of corresponding entries of device detection logs for a pair of devices does not satisfy the synchronization error threshold, the central facility 118 populates the column of the candidate colocation count variable for the pair of devices with values indicating that device identifiers detected during the scans did not match. In the example of FIG. 2, by recording the matching and non-matching instances of device identifiers in a candidate colocation count variable corresponding to the pair of end-user devices, the central facility 118 can track whether the two-end user devices were physically proximate to one another over a period of time. If the pair of end-user devices detect the same end-user devices (e.g., BLE devices) in unison, then the central facility 118 identifies the pair of end-user devices as co-located during generation of the pair of device detection log.

For example, to determine whether a pair of end-user devices are co-located, the central facility 118 computes a metric based on the matching instances in the candidate colocation count variable and compares the metric to a colocation threshold. If the metric satisfies a colocation threshold, the central facility 118 identifies the pair of end-user devices as co-located. Additionally, the central facility 118 disregards audience measurement data generated by the pair of end-user devices for at least a period of time corresponding to the generation of the device detection logs. If the metric does not satisfy the colocation threshold, the central facility 118 identifies the pair of end-user devices as not co-located.

In the illustrated example of FIG. 1, many metrics may be used to evaluate whether two end-user devices are co-located. For example, the central facility 118 computes a sum of matching instances in the candidate colocation count variable. In additional or alternative examples, the central facility 118 computes a percentage of matching instances out of the total number of possible matching instances. Depending on the metric utilized by the central facility 118, the colocation threshold may change. In some examples, the colocation threshold is trained using artificial intelligence.

As described above, multiple techniques may be utilized to determine matching and non-matching instances of device identifiers in corresponding entries of device detection logs. For example, the central facility 118 iteratively processes (e.g., using one or more for loops) corresponding entries of the device detection logs to determine matching and non-matching instances of device identifiers in the corresponding entries of the device detection logs. In additional or alternative examples, the central facility 118 execute a string comparison algorithm on (e.g., computes the Levenshtein Distance between, computes the Hamming distance between, etc.) device identifiers in the corresponding entries of the device detection logs. In some examples, the central facility 118 executes a execute a hidden Markov model on device identifiers in the corresponding entries of the device detection logs.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a hidden Markov model is used. Using a hidden Markov model enables a device executing the model to determine whether two device detection logs indicate that end-user devices that detected the device detection logs indicate that the end-user devices are co-located. In general, machine learning models/architectures that are suitable to use in example approaches disclosed herein will be those that provide pattern recognition. However, other types of machine learning models could additionally or alternatively be used such as a nearest neighbor model, a support vector machine (SVM) model (e.g., a linear SVM, a radial basis function SVM, etc.), a Gaussian process model, a decision tree model, a neural network, an adaptive boosting (Ada-Boost) model, a quadratic discriminant analysis model, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction and/or operation to be executed and/or instantiated by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In some examples, the central facility 118 determines additional information based on the device detection logs. For example, the central facility 118 may implement a set of rules related to signal strength of detected device detection signals to determine information about the location of a corresponding end-user device in relation to detected RF devices. For example, if the respective signal strengths of multiple device detection signals of an RF device decrease over multiple scans, the central facility 118 determines that the end-user device that detected the multiple device detection signals is moving away from the RF device over time.

While the example of FIG. 1 describes detecting whether two or more audience measurement meters are co-located on the same panelist, it should be understood that examples disclosed herein are not limited to detecting instances of duplicate wear. On the contrary, examples disclosed herein are applicable in many examples. For example, disclosed examples may be applied to detect whether two or more people work physically close together and/or to derive other behavior intelligence.

FIG. 2 is a block diagram of the example central facility 118 to determine whether two end-user devices are co-located. The central facility 118 of FIG. 2 may be instantiated (e.g., creating an instance of, bring into being for any length of time, materialize, implement, etc.) by processor circuitry such as a central processing unit executing instructions. Additionally or alternatively, the central facility 118 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the illustrate example of FIG. 2, the central facility 118 includes example network interface control circuitry 202, example device detection log analysis circuitry 204, example comparator circuitry 206, and an example analysis datastore 208. In the example of FIG. 2, any of the network interface control circuitry 202, the device detection log analysis circuitry 204, the comparator circuitry 206, and/or the analysis datastore 208 can communicate via an example communication bus 210.

In examples disclosed herein, the communication bus 210 may be implemented using any suitable wired and/or wireless communication. In additional or alternative examples, the communication bus 210 includes software, machine-readable instructions, and/or communication protocols by which information is communicated among the network interface control circuitry 202, the device detection log analysis circuitry 204, the comparator circuitry 206, and/or the analysis datastore 208.

In the illustrated example of FIG. 2, the network interface control circuitry 202 accesses one or more device detection logs generated by end-user devices in the media presentation environment 102. For example, the network interface control circuitry 202 causes transmission circuitry (e.g., a receiver, a transceiver, etc.) of the central facility 118 to access, from the network 122, a first device detection log generated by a first end-user device and a second device detection log generated by a second end-user device. In additional or alternative examples, the network interface control circuitry 202 accesses a first device detection log and a second device detection log from the analysis datastore 208. The network interface control circuitry 202 forwards the device detection logs to the device detection log analysis circuitry 204.

In the illustrated example of FIG. 2, after the comparator circuitry 206 determines whether at least two end-user devices are co-located, the network interface control circuitry 202 causes transmission circuitry (e.g., a transmitter, a transceiver, etc.) of the central facility 118 to transmit an alert indicating the result of the determination. For example, if the comparator circuitry 206 determines that two end-user devices are co-located, the network interface control circuitry 202 causes transmission of an alert indicating the first end-user device and the second end-user device were co-located during generation of the first device detection log and the second device detection log. In some examples, the alert also indicates that audience measurement data generated by the first end-user device and the second end-user device should be disregarded for at least a period of time corresponding to the generation of the first device detection log and the second device detection log. Additionally or alternatively, the network interface control circuitry 202 transmits an alert to the panelists to whom the end-user devices are assigned. Such an alert includes a warning to the panelists to stop duplicate wear of the end-user devices. In some examples, the network interface control circuitry 202 is instantiated by processor circuitry executing network interface control instructions and/or configured to perform operations such as those represented by the flowchart of FIG. 5.

In some examples, the central facility 118 includes means for controlling a network interface. For example, the means for controlling a network interface may be implemented by the network interface control circuitry 202. In some examples, the network interface control circuitry 202 may be instantiated by processor circuitry such as the example processor circuitry 612 of FIG. 6. For instance, the network interface control circuitry 202 may be instantiated by the example microprocessor 800 of FIG. 8 executing machine executable instructions such as those implemented by at least blocks 502 and 520 of FIG. 5. In some examples, the network interface control circuitry 202 may be instantiated by hardware logic circuitry, which may be implemented by an ASIC, XPU, or the FPGA circuitry 900 of FIG. 9 structured to perform operations corresponding to the machine readable instructions. Additionally or alternatively, the network interface control circuitry 202 may be instantiated by any other combination of hardware, software, and/or firmware. For example, the network interface control circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the central facility 118 includes the device detection log analysis circuitry 204. In the example of FIG. 2, the device detection log analysis circuitry 204 compares two or more device detection logs. For example, the device detection log analysis circuitry 204 compares a first entry of a first device detection log to a first entry of a second device detection log. In the example of FIG. 2, the device detection log analysis circuitry 204 determines whether a difference between a first sampling time of the first entry of the first device detection log and a second sampling time of the first entry of the second device detection log satisfies a synchronization error threshold. As described above, the synchronization error threshold may be trained using artificial intelligence. In response to determining that the difference between the first sampling time and the second sampling time satisfies the synchronization error threshold, the device detection log analysis circuitry 204 determines matching instances of at least one first device identifier of the first entry of the first device detection log and at least one second device identifier of the first entry of the second device detection log.

As described above, in some examples, the device detection log analysis circuitry 204 iteratively compares the first entry of the first device detection log to the first entry of the second device detection log. In some examples, the device detection log analysis circuitry 204 executes a string comparison algorithm on (e.g., computes the Levenshtein Distance between, computes the Hamming distance between, etc.) the at least one first device identifier in the first entry of the first device detection log and the at least one second device identifier in the first entry of the second device detection log. Additionally or alternatively, the device detection log analysis circuitry 204 executes a execute a hidden Markov model on the at least one first device identifier in the first entry of the first device detection log and the at least one second device identifier in the first entry of the second device detection log.

In the illustrated example of FIG. 2, the device detection log analysis circuitry 204 populates a candidate colocation count variable with the matching instances of device identifiers. As described above, the candidate colocation count variable may be implemented as a matrix and corresponds to the first end-user device and the second end-user device. For example, the candidate colocation count variable may be stored in the analysis datastore 208. In the example of FIG. 2, the device detection log analysis circuitry 204 populates the candidate colocation count variable by causing storage of one or more values in the analysis datastore 208.

As described above, in response to determining that the difference between the first sampling time and the second sampling time does not satisfy the synchronization error threshold, the device detection log analysis circuitry 204 populates the column of the candidate colocation count variable for the first end-user device and the second end-user device with values indicating that device identifiers detected during the scans did not match. The device detection log analysis circuitry 204 repeats this process for all entries of the device detection logs. In some examples, the device detection log analysis circuitry 204 is instantiated by processor circuitry executing device detection log analysis instructions and/or configured to perform operations such as those represented by the flowchart of FIG. 5.

In some examples, the central facility 118 includes means for analyzing device detection logs. For example, the means for analyzing device detection logs may be implemented by the device detection log analysis circuitry 204. In some examples, the device detection log analysis circuitry 204 may be instantiated by processor circuitry such as the example processor circuitry 612 of FIG. 6. For instance, the device detection log analysis circuitry 204 may be instantiated by the example microprocessor 800 of FIG. 8 executing machine executable instructions such as those implemented by at least blocks 502, 504, 506, 508, 510, 512, and 514 of FIG. 5. In some examples, the device detection log analysis circuitry 204 may be instantiated by hardware logic circuitry, which may be implemented by an ASIC, XPU, or the FPGA circuitry 900 of FIG. 9 structured to perform operations corresponding to the machine readable instructions. Additionally or alternatively, the device detection log analysis circuitry 204 may be instantiated by any other combination of hardware, software, and/or firmware. For example, the device detection log analysis circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the central facility 118 includes the comparator circuitry 206. In the example of FIG. 2, the comparator circuitry 206 computes a metric based on the matching instances of the candidate colocation count variable. For example, the comparator circuitry 206 computes the sum of matching instances of the candidate colocation count variable. The comparator circuitry 206 also determines whether the metric of the candidate colocation count variable satisfies a colocation threshold. As described above, the colocation threshold may be trained using artificial intelligence. In the example of FIG. 2, the comparator circuitry 206 determines whether the metric for the candidate colocation count variable is greater than or equal to the colocation threshold. In some examples, the comparator circuitry 206 is instantiated by processor circuitry executing comparator instructions and/or configured to perform operations such as those represented by the flowchart of FIG. 5.

In some examples, the central facility 118 includes means for comparing. For example, the means for comparing may be implemented by the comparator circuitry 206. In some examples, the comparator circuitry 206 may be instantiated by processor circuitry such as the example processor circuitry 612 of FIG. 6. For instance, the comparator circuitry 206 may be instantiated by the example microprocessor 800 of FIG. 8 executing machine executable instructions such as those implemented by at least blocks 516 and 518 of FIG. 5. In some examples, the comparator circuitry 206 may be instantiated by hardware logic circuitry, which may be implemented by an ASIC, XPU, or the FPGA circuitry 900 of FIG. 9 structured to perform operations corresponding to the machine readable instructions. Additionally or alternatively, the comparator circuitry 206 may be instantiated by any other combination of hardware, software, and/or firmware. For example, the comparator circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the central facility 118 includes the analysis datastore 208 to record data (e.g., one or more device detection logs, one or more candidate colocation count variables, one or more metrics for corresponding candidate colocation count variables, a synchronization error threshold, a colocation threshold, etc.). In the illustrated example, the analysis datastore 208 is a storage including data representative of one or more device detection logs, one or more candidate colocation count variables, one or more metrics for corresponding candidate colocation count variables, a synchronization error threshold, and/or a colocation threshold. Alternatively, the analysis datastore 208 may store any other type of data.

In the illustrated example of FIG. 2, the analysis datastore 208 may be implemented by a volatile memory (e.g., a Synchronous Dynamic Random-Access Memory (SDRAM), Dynamic Random-Access Memory (DRAM), RAMBUS Dynamic Random-Access Memory (RDRAM), etc.) and/or a non-volatile memory (e.g., flash memory). The analysis datastore 208 may additionally or alternatively be implemented by one or more double data rate (DDR) memories, such as DDR, DDR2, DDR3, DDR4, mobile DDR (mDDR), etc. The analysis datastore 208 may additionally or alternatively be implemented by one or more mass storage devices such as hard disk drive(s), compact disk drive(s), digital versatile disk drive(s), solid-state disk drive(s), etc.

While in the illustrated example the analysis datastore 208 is illustrated as a single datastore, the analysis datastore 208 may be implemented by any number and/or type(s) of datastores. Furthermore, the data stored in the analysis datastore 208 may be in any data format such as, for example, binary data, comma delimited data, tab delimited data, structured query language (SQL) structures, etc. Alternatively, the analysis datastore 208 may be located externally to the central facility 118.

Figure 3:
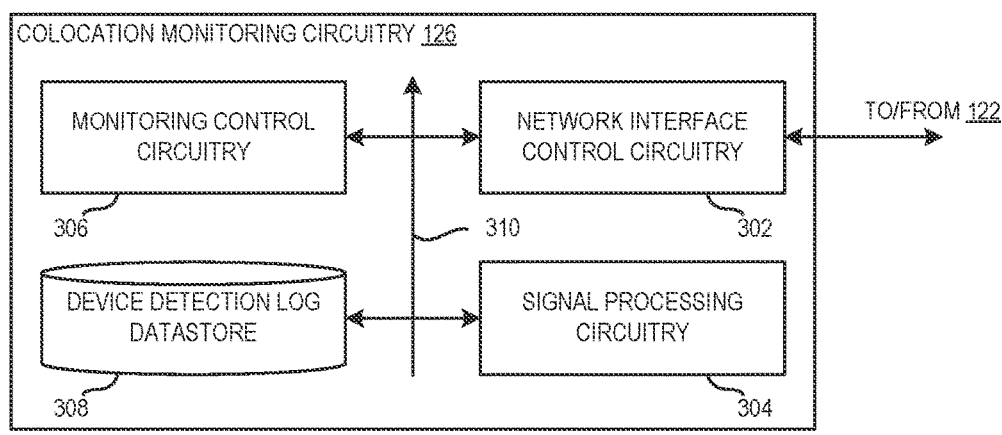
FIG. 3 is a block diagram of the example colocation monitoring circuitry of FIG. 1 to report one or more device detection logs.

FIG. 3 is a block diagram of the example colocation monitoring circuitry 126 of FIG. 1 to report one or more device detection logs. The colocation monitoring circuitry 126 of FIG. 3 may be instantiated (e.g., creating an instance of, bring into being for any length of time, materialize, implement, etc.) by processor circuitry such as a central processing unit executing instructions. Additionally or alternatively, the colocation monitoring circuitry 126 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

In the illustrate example of FIG. 3, the colocation monitoring circuitry 126 includes example network interface control circuitry 302, example signal processing circuitry 304, example monitoring control circuitry 306, and an example device detection log datastore 308. In the example of FIG. 2, any of the network interface control circuitry 302, the signal processing circuitry 304, the monitoring control circuitry 306, and/or the device detection log datastore 308 can communicate via an example communication bus 310.

In examples disclosed herein, the communication bus 310 may be implemented using any suitable wired and/or wireless communication. In additional or alternative examples, the communication bus 310 includes software, machine-readable instructions, and/or communication protocols by which information is communicated among the network interface control circuitry 302, the signal processing circuitry 304, the monitoring control circuitry 306, and/or the device detection log datastore 308.

In the illustrated example of FIG. 3, the network interface control circuitry 302 causes transmission circuitry (e.g., a receiver, a transceiver) of the first wireless device 124 to scan an environment for one or more device detection signals. For example, the network interface control circuitry 302 causes the transmission circuitry of the first wireless device 124 to scan the media presentation environment 102 for one or more device detection signals.

As described above, the first wireless device 124 logs received device detection signals in a device detection log. After the first wireless device 124 generates a device detection log, the network interface control circuitry 302 causes the transmission circuitry (e.g., a transmitter, a transceiver, etc.) of the device detection log to the central facility 118. In some examples, the network interface control circuitry 302 is instantiated by processor circuitry executing network interface control instructions and/or configured to perform operations such as those represented by the flowchart of FIG. 4.

In some examples, the colocation monitoring circuitry 126 includes means for controlling a network interface. For example, the means for controlling a network interface may be implemented by the network interface control circuitry 302. In some examples, the network interface control circuitry 302 may be instantiated by processor circuitry such as the example processor circuitry 712 of FIG. 7. For instance, the network interface control circuitry 302 may be instantiated by the example microprocessor 800 of FIG. 8 executing machine executable instructions such as those implemented by at least blocks 402, 404, 412, and 418 of FIG. 4. In some examples, the network interface control circuitry 302 may be instantiated by hardware logic circuitry, which may be implemented by an ASIC, XPU, or the FPGA circuitry 900 of FIG. 9 structured to perform operations corresponding to the machine readable instructions. Additionally or alternatively, the network interface control circuitry 302 may be instantiated by any other combination of hardware, software, and/or firmware. For example, the network interface control circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 3, the colocation monitoring circuitry 126 includes the signal processing circuitry 304. In the example of FIG. 3, the signal processing circuitry 304 determines whether detected device detection signals correspond to devices that are nearby to the first wireless device 124. For example, wireless devices may be within a detectable range of the first wireless device 124 but too far away to be considered near to the first wireless device 124. To determine whether detected device detection signals correspond to nearby devices, the signal processing circuitry 304 compares the signal strength of detected device detection signals to a signal strength threshold. For example, the signal processing circuitry 304 computes a received signal strength indicator (RSSI) for a detected device detection signal.

In the illustrated example of FIG. 3, the signal processing circuitry 304 compares the signal strength of a detected device detection signal to the signal strength threshold. In response to determining that the signal strength of a detected device detection signal satisfies the signal strength threshold, the signal processing circuitry 304 extracts a device identifier corresponding to a device that transmitted the device detection signal. For the current scan of the environment, the signal processing circuitry 304 causes storage of a sampling time for the current scan and the device identifier corresponding to the device that transmitted the device detection signal.

In the illustrated example of FIG. 3, in response to determining that the signal strength of a detected device detection signal does not satisfy the signal strength threshold, the device detection signal is disregarded. The signal processing circuitry 304 repeats this process for all device detection signals detected during the current scan. In this manner, the signal processing circuitry 304 generates an entry for a device detection log corresponding to the first wireless device 124. As such, the signal processing circuitry 304 limits (e.g., to only top 3-5 BLE devices at each scan) the number of device identifiers logged in the device detection log to those devices that are nearby the first wireless device 124 for the current scan. In some examples, the signal processing circuitry 304 is instantiated by processor circuitry executing signal processing instructions and/or configured to perform operations such as those represented by the flowchart of FIG. 4.

In some examples, the colocation monitoring circuitry 126 includes means for processing signals. For example, the means for processing signals may be implemented by the signal processing circuitry 304. In some examples, the signal processing circuitry 304 may be instantiated by processor circuitry such as the example processor circuitry 712 of FIG. 7. For instance, the signal processing circuitry 304 may be instantiated by the example microprocessor 800 of FIG. 8 executing machine executable instructions such as those implemented by at least blocks 406, 408, and 410 of FIG. 4. In some examples, the signal processing circuitry 304 may be instantiated by hardware logic circuitry, which may be implemented by an ASIC, XPU, or the FPGA circuitry 900 of FIG. 9 structured to perform operations corresponding to the machine readable instructions. Additionally or alternatively, the signal processing circuitry 304 may be instantiated by any other combination of hardware, software, and/or firmware. For example, the signal processing circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 3, the colocation monitoring circuitry 126 includes the monitoring control circuitry 306. In the example of FIG. 3, the monitoring control circuitry 306 controls the length of monitoring for co-located devices. For example, the monitoring control circuitry 306 determines whether a threshold number of scans of the environment have been completed. In the illustrated example of FIG. 3, the threshold number of scans corresponds to several hours. To maintain the number of completed scans, the monitoring control circuitry 306 maintains a count of scans.

In the illustrated example of FIG. 3, in response to the monitoring control circuitry 306 determining that a threshold number of scans have not been completed, the monitoring control circuitry 306 determines whether a monitoring interval has passed. In response to the monitoring control circuitry 306 determining that the monitoring interval has passed, the monitoring control circuitry 306 instructs the network interface control circuitry 302 to initiate another scan of the environment. In response to the monitoring control circuitry 306 determining that the monitoring interval has passed, the monitoring control circuitry 306 continues to determine whether the monitoring interval has passed.

In the illustrated example of FIG. 3, in response to determining that the threshold number of scans have been completed, the monitoring control circuitry 306 instructs the network interface control circuitry 302 to transmit the device detection log to the central facility 118. In some examples, the monitoring control circuitry 306 is instantiated by processor circuitry executing monitoring control instructions and/or configured to perform operations such as those represented by the flowchart of FIG. 4.

In some examples, the colocation monitoring circuitry 126 includes means for controlling monitoring. For example, the means for controlling monitoring may be implemented by the monitoring control circuitry 306. In some examples, the monitoring control circuitry 306 may be instantiated by processor circuitry such as the example processor circuitry 712 of FIG. 7. For instance, the monitoring control circuitry 306 may be instantiated by the example microprocessor 800 of FIG. 8 executing machine executable instructions such as those implemented by at least blocks 414 and 416 of FIG. 4. In some examples, the monitoring control circuitry 306 may be instantiated by hardware logic circuitry, which may be implemented by an ASIC, XPU, or the FPGA circuitry 900 of FIG. 9 structured to perform operations corresponding to the machine readable instructions. Additionally or alternatively, the monitoring control circuitry 306 may be instantiated by any other combination of hardware, software, and/or firmware. For example, the monitoring control circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 3, the central facility 118 includes the device detection log datastore 308 to record data (e.g., a device detection log (including entries having respective sampling times and respective device identifiers) for the first wireless device 124, a count of scans, a threshold number of scans, a signal strength threshold, etc.). In the illustrated example, the device detection log datastore 308 is a storage including data representative of a device detection log (including entries having respective sampling times and respective device identifiers) for the first wireless device 124, a count of scans, a threshold number of scans, and/or a signal strength threshold. Alternatively, the device detection log datastore 308 may store any other type of data.

In the illustrated example of FIG. 3, the device detection log datastore 308 may be implemented by a volatile memory (e.g., a Synchronous Dynamic Random-Access Memory (SDRAM), Dynamic Random-Access Memory (DRAM), RAMBUS Dynamic Random-Access Memory (RDRAM), etc.) and/or a non-volatile memory (e.g., flash memory). The device detection log datastore 308 may additionally or alternatively be implemented by one or more double data rate (DDR) memories, such as DDR, DDR2, DDR3, DDR4, mobile DDR (mDDR), etc. The device detection log datastore 308 may additionally or alternatively be implemented by one or more mass storage devices such as hard disk drive(s), compact disk drive(s), digital versatile disk drive(s), solid-state disk drive(s), etc.

While in the illustrated example the device detection log datastore 308 is illustrated as a single datastore, the device detection log datastore 308 may be implemented by any number and/or type(s) of datastores. Furthermore, the data stored in the device detection log datastore 308 may be in any data format such as, for example, binary data, comma delimited data, tab delimited data, structured query language (SQL) structures, etc. Alternatively, the device detection log datastore 308 may be located externally to the first wireless device 124.

While an example manner of implementing the central facility 118 of FIG. 1 is illustrated in FIG. 2, one or more of the elements, processes, and/or devices illustrated in FIG. 2 may be combined, divided, re-arranged, omitted, eliminated, and/or implemented in any other way. Additionally, while an example manner of implementing the colocation monitoring circuitry 126 of FIG. 1 is illustrated in FIG. 3, one or more of the elements, processes, and/or devices illustrated in FIG. 3 may be combined, divided, re-arranged, omitted, eliminated, and/or implemented in any other way. Further, the example network interface control circuitry 202, the example device detection log analysis circuitry 204, the example comparator circuitry 206, the example analysis datastore 208, and/or, more generally, the example central facility 118 of FIGS. 1 and/or 2 and/or the example network interface control circuitry 302, the example signal processing circuitry 304, the example monitoring control circuitry 306, the example device detection log datastore 308, and/or, more generally, the example colocation monitoring circuitry 126, may be implemented by hardware alone or by hardware in combination with software and/or firmware. Thus, for example, any of the example network interface control circuitry 202, the example device detection log analysis circuitry 204, the example comparator circuitry 206, the example analysis datastore 208, and/or, more generally, the example central facility 118 of FIGS. 1 and/or 2 and/or the example network interface control circuitry 302, the example signal processing circuitry 304, the example monitoring control circuitry 306, the example device detection log datastore 308, and/or, more generally, the example colocation monitoring circuitry 126, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example central facility 118 of FIGS. 1 and/or 2 may include one or more elements, processes, and/or devices in addition to, or instead of, those illustrated in FIG. 2, and/or may include more than one of any or all of the illustrated elements, processes, and devices. Additionally, the example colocation monitoring circuitry 126 of FIGS. 1 and/or 3 may include one or more elements, processes, and/or devices in addition to, or instead of, those illustrated in FIG. 3, and/or may include more than one of any or all of the illustrated elements, processes, and devices.

Figure 4:
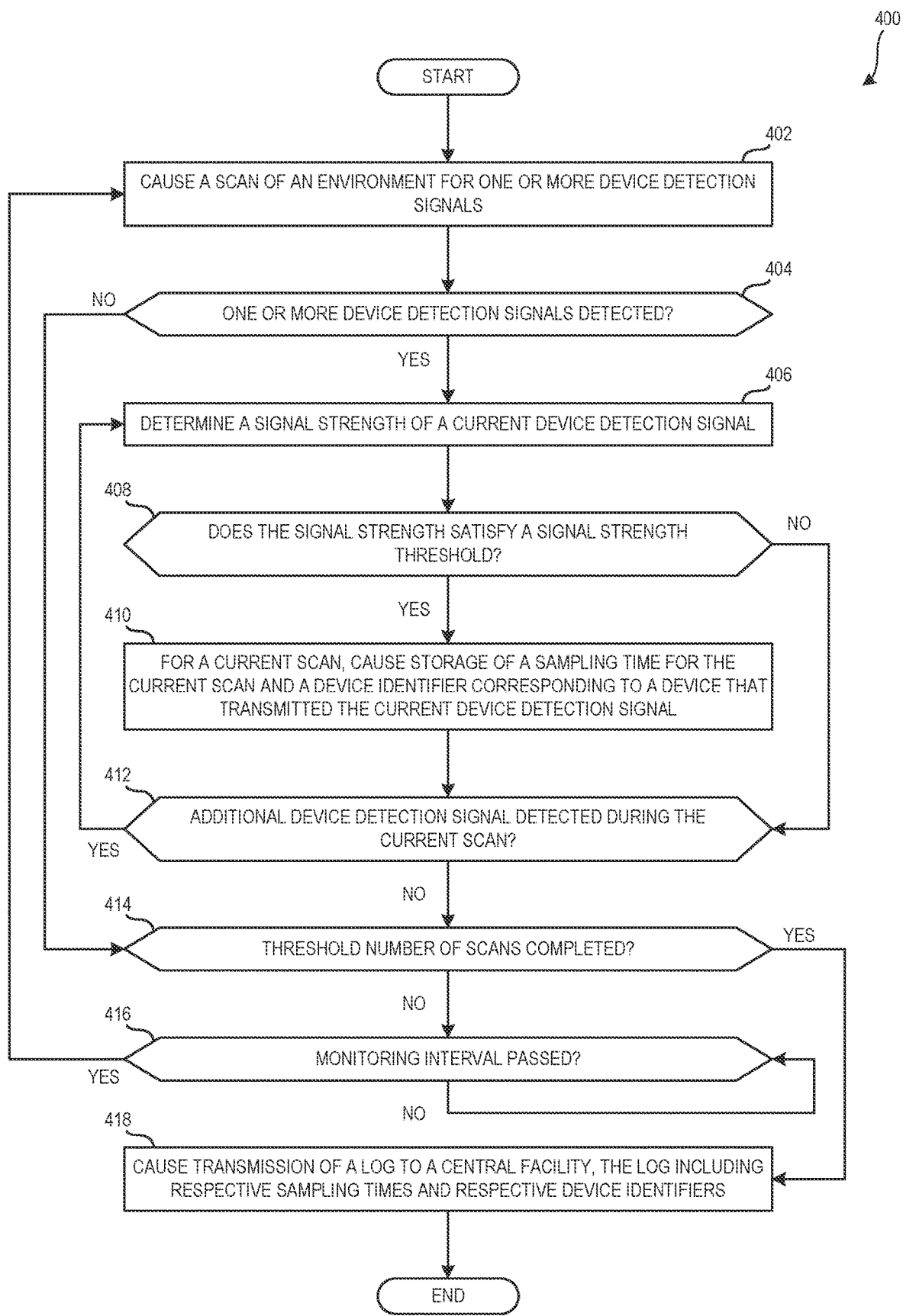
FIG. 4 is a flowchart representative of example machine readable instructions and/or example operations that may be executed and/or instantiated by processor circuitry to implement the colocation monitoring circuitry of FIGS. 1 and/or 3.
Figure 5:
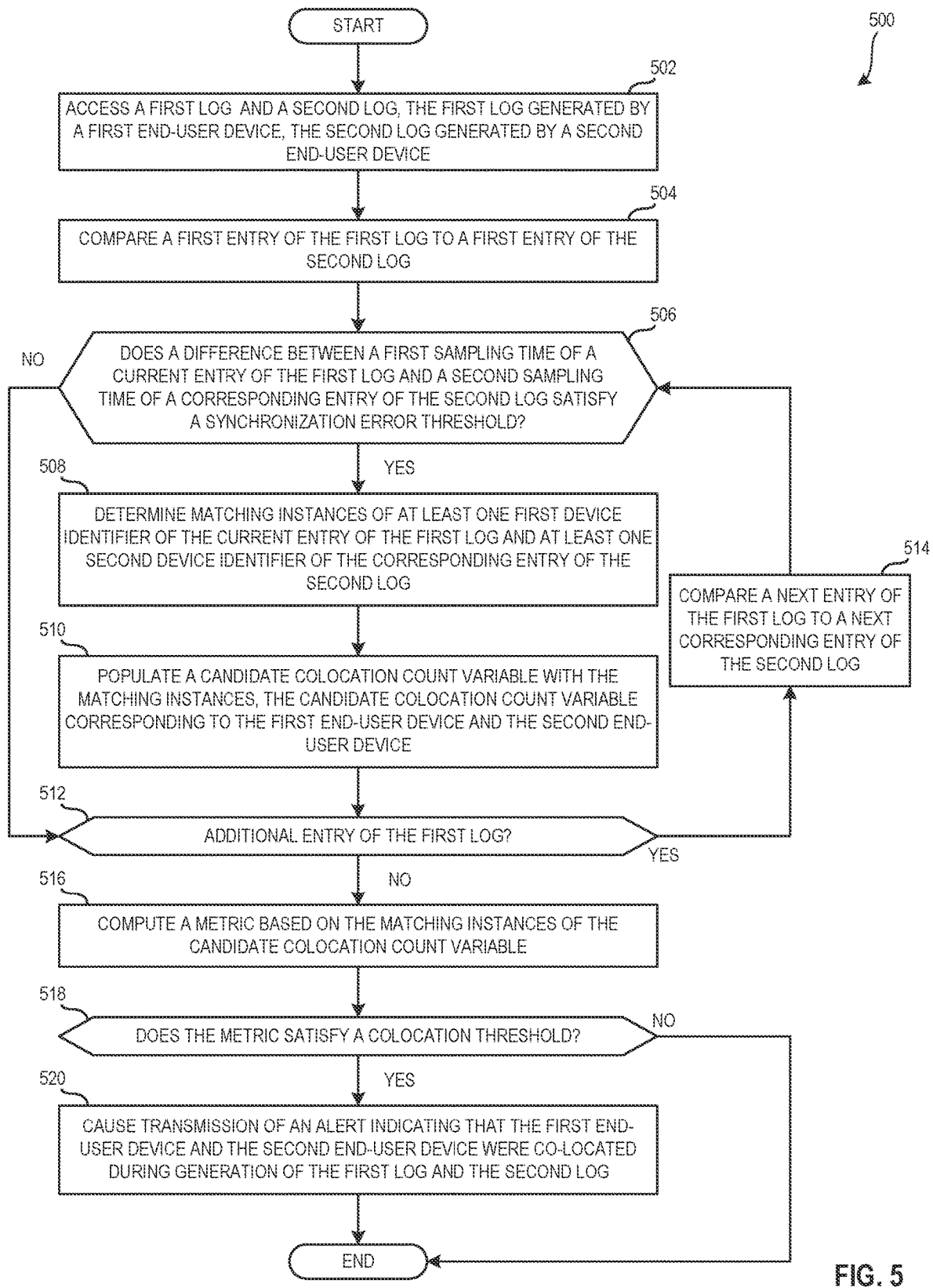
FIG. 5 is a flowchart representative of example machine readable instructions and/or example operations that may be executed and/or instantiated by processor circuitry to implement the central facility of FIGS. 1 and/or 2.

A flowchart representative of example machine readable instructions, which may be executed to configure processor circuitry (e.g., the instructions cause processor circuitry) to implement the central facility 118 of FIGS. 1 and/or 2, is shown in FIG. 5. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 8 and/or 9. A flowchart representative of example machine readable instructions, which may be executed to configure processor circuitry (e.g., the instructions cause processor circuitry) to implement the colocation monitoring circuitry 126 of FIGS. 1 and/or 3, is shown in FIG. 4. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9.

The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device).

Similarly, the non-transitory computer readable storage media may include one or more mediums located in one or more hardware devices. Further, although the example program is described with reference to the flowcharts illustrated in FIGS. 4 and/or 5, many other methods of implementing the example central facility 118 and/or the example colocation monitoring circuitry 126 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 4 and/or 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to implement the colocation monitoring circuitry 126 of FIGS. 1 and/or 3. The machine readable instructions and/or the operations 400 of FIG. 4 begin at block 402, at which the network interface control circuitry 302 causes a scan of an environment for one or more device detection signals. For example, at block 402, the network interface control circuitry 302 causes transmission circuitry of the first wireless device 124 to scan the media presentation environment 102 for one or more device detection signals.

In the illustrated example of FIG. 4, at block 404, the network interface control circuitry 302 determines whether one or more device detection signals have been detected. In response to the network interface control circuitry 302 determining that one or more device detection signals have not been detected (block 404: NO), the machine readable instructions and/or the operations 400 proceed to block 414. In response to the network interface control circuitry 302 determining that one or more device detection signals have been detected (block 404: YES), the machine readable instructions and/or the operations 400 proceed to block 406.

In the illustrated example of FIG. 4, at block 406, the signal processing circuitry 304 determines a signal strength of a current device detection signal. For example, at block 406, the signal processing circuitry 304 determines an RSSI of the current device detection signal. At block 408, the signal processing circuitry 304 determines whether the signal strength satisfies a signal strength threshold. For example, at block 408, the signal processing circuitry 304 determines whether the signal strength is greater than or equal to the signal strength threshold.

In the illustrated example of FIG. 3, in response to the signal processing circuitry 304 determining that the signal strength does not satisfy the signal strength threshold (block 408: NO), the machine readable instructions and/or the operations 400 proceed to block 412. In response to the signal processing circuitry 304 determining that the signal strength satisfies the signal strength threshold (block 408: YES), the machine readable instructions and/or the operations 400 proceed to block 410. At block 410, for a current scan, the signal processing circuitry 304 causes storage of a sampling time for the current scan and a device identifier corresponding to a device that transmitted the current device detection signal.

In the illustrated example of FIG. 4, at block 412, the network interface control circuitry 302 determines whether an additional device detection signal was detected during the current scan. In response to the network interface control circuitry 302 determining that an additional device detection signal was detected during the current scan (block 412: YES), the machine readable instructions and/or the operations 400 return to block 406. In response to the network interface control circuitry 302 determining that an additional device detection signal was not detected during the current scan (block 412: NO), the machine readable instructions and/or the operations 400 proceed to block 414.

In the illustrated example of FIG. 5, at block 414, the monitoring control circuitry 306 determines whether a threshold number of scans have been completed. As described above, the threshold number of scans corresponds to an amount of time sufficient to accurately determine that a pair of end-user devices (e.g., meters) were co-located during the generation of a corresponding pair of device detection logs. In the example of FIG. 5, the threshold number of scans corresponds to several hours of monitoring the environment. In response to the monitoring control circuitry 306 determining that the threshold number of scans have been completed (block 414: YES), the machine readable instructions and/or the operations 400 proceed to block 418. In response to the monitoring control circuitry 306 determining that the threshold number of scans have not been completed (block 414: NO), the machine readable instructions and/or the operations 400 proceed to block 416.

In the illustrated example of FIG. 4, at block 416, the monitoring control circuitry 306 determines whether a monitoring interval has passed. In response to the monitoring control circuitry 306 determining that the monitoring interval has passed (block 416: YES), the machine readable instructions and/or the operations 400 return to block 402. In response to the monitoring control circuitry 306 determining that the monitoring interval has not passed (block 416: NO), the machine readable instructions and/or the operations 400 return to block 402.

In the illustrated example of FIG. 4, at block 418, the network interface control circuitry 302 causes transmission of a log to the central facility 118. In the example of FIG. 4, the log includes respective sampling times and respective device identifiers. After block 416, the machine readable instructions and/or the operations 400 terminate. The machine readable instructions and/or the operations 400 may be re-executed and/or re-instantiated by processor circuitry to generate an additional device detection log for the first wireless device 124.

FIG. 5 is a flowchart representative of example machine readable instructions and/or example operations 500 that may be executed and/or instantiated by processor circuitry to implement the central facility 118 of FIGS. 1 and/or 2. The machine readable instructions and/or the operations 500 of FIG. 5 begin at block 502, at which the network interface control circuitry 202 accesses a first log and a second log. For example, the first log corresponds to a device detection log generated by a first end-user device (e.g., a meter) and the second log corresponds to a device detection log generated by a second end-user device (e.g., a meter).

In the illustrated example of FIG. 5, at block 502, the network interface control circuitry 202 accesses the first log and the second log via the network 122 of FIG. 1. In some examples, if the network interface control circuitry 202 has already caused storage of the first log and the second log in the analysis datastore 208, then, at block 502, the device detection log analysis circuitry 204 accesses the first log and the second log from the analysis datastore 208. At block 504, the device detection log analysis circuitry 204 compares a first entry of the first log to a first entry of the second log.

In the illustrated example of FIG. 5, at block 506, the device detection log analysis circuitry 204 determines whether a difference between a first sampling time of a current entry of the first log and a second sampling time of a corresponding entry of the second log satisfies a synchronization error threshold. As described above, in some examples, the synchronization error threshold is trained using artificial intelligence. In the example of FIG. 5, at block 506, the device detection log analysis circuitry 204 determines whether the difference between the first sampling time and the second sampling time is less than or equal to the synchronization error threshold.

In the illustrated example of FIG. 5, in response to the device detection log analysis circuitry 204 determining that the difference between the first sampling time and the second sampling time does not satisfy the synchronization error threshold (block 506: NO), the machine readable instructions and/or the operations 500 proceed to block 512. In response to the device detection log analysis circuitry 204 determining that the difference between the first sampling time and the second sampling time satisfies the synchronization error threshold (block 506: YES), the machine readable instructions and/or the operations 500 proceed to block 508. At block 508, the device detection log analysis circuitry 204 determines matching instances of at least one first device identifier of the current entry of the first log and at least one second device identifier of the corresponding entry of the second log.

In the illustrated example of FIG. 5, at block 510, the device detection log analysis circuitry 204 populates a candidate colocation count variable with the matching instances. For example, the candidate colocation count variable corresponds to the first end-user device (e.g., meter) and the second end-user device (e.g., meter). At block 512, the device detection log analysis circuitry 204 determines whether there is an additional entry of the first log. In response to the device detection log analysis circuitry 204 determining that there is not an additional entry in the first log (block 512: NO), the machine readable instructions and/or the operations 500 proceed to block 516. In response to the device detection log analysis circuitry 204 determining that there is an additional entry in the first log (block 512: YES), the machine readable instructions and/or the operations 500 proceed to block 514.

In the illustrated example of FIG. 5, at block 514, the device detection log analysis circuitry 204 compares a next entry of the first log to a next corresponding entry of the second log. At block 516, the comparator circuitry 206 computes a metric based on the matching instances of the candidate colocation count variable. At block 518, the comparator circuitry 206 determines whether the metric satisfies a colocation threshold. As described above, in some examples, the colocation threshold is trained using artificial intelligence. In the example of FIG. 5, at block 516, the comparator circuitry 206 determines whether the metric is greater than or equal to the colocation threshold.

In the illustrated example of FIG. 5, in response to the comparator circuitry 206 determining that the metric satisfies the colocation threshold (block 518: YES), the machine readable instructions and/or the operations 500 proceed to block 520. At block 520, the network interface control circuitry 202 causes transmission of an alert. For example, the alert indicates that the first end-user device (e.g., meter) and the second end-user device (e.g., meter) were co-located during generation of the first log and the second log. Additionally or alternatively, the alert indicates that audience measurement data generated by the first end-user device and the second end-user device should be disregarded for at least a period of time corresponding to the generation of the first device detection log and the second device detection log. In some examples, in response to the comparator circuitry 206 determining that the metric satisfies the colocation threshold (block 518: YES), the network interface 202 causes audience measurement data generated by the first end-user device and the second end-user device to be deleted for at least the period of time corresponding to the generation of the first device detection log and the second device detection log. In the illustrated example of FIG. 5, in response to the comparator circuitry 206 determining that the metric does not satisfy the colocation threshold (block 518: NO), the machine readable instructions and/or the operations 500 terminate. The machine readable instructions and/or the operations 500 may be re-executed and/or re-instantiated by processor circuitry to evaluate an additional pair of device detection logs.

In some examples, in response to the comparator circuitry 206 determining that the metric satisfies the colocation threshold (block 518: YES), the network interface control circuitry 202 causes transmission (e.g., is to cause transmission) of an alert to the panelists to whom the end-user devices are assigned. Such an alert includes a warning to the panelists to stop duplicate wear of the end-user devices. For example, the network interface control circuitry 202 causes a display of the first wireless device 124 to display a message indicating that duplicate wear has been detected and that the panelist should cease duplicate wear of the first wireless device 124 and at least one additional end-user device. Additionally or alternatively, the network interface control circuitry 202 causes an audio output of the first wireless device 124 to an audio message indicating that duplicate wear has been detected and that the panelist should cease duplicate wear of the first wireless device 124 and at least one additional end-user device. In some examples, in response to the comparator circuitry 206 determining that the metric satisfies the colocation threshold (block 518: YES), the comparator circuitry 206 causes storage of an indication (e.g., in the analysis datastore 208). The example indication records an identifier for the panelists associated with the end-user devices that have been detected as co-located at one panelist.

Figure 6:
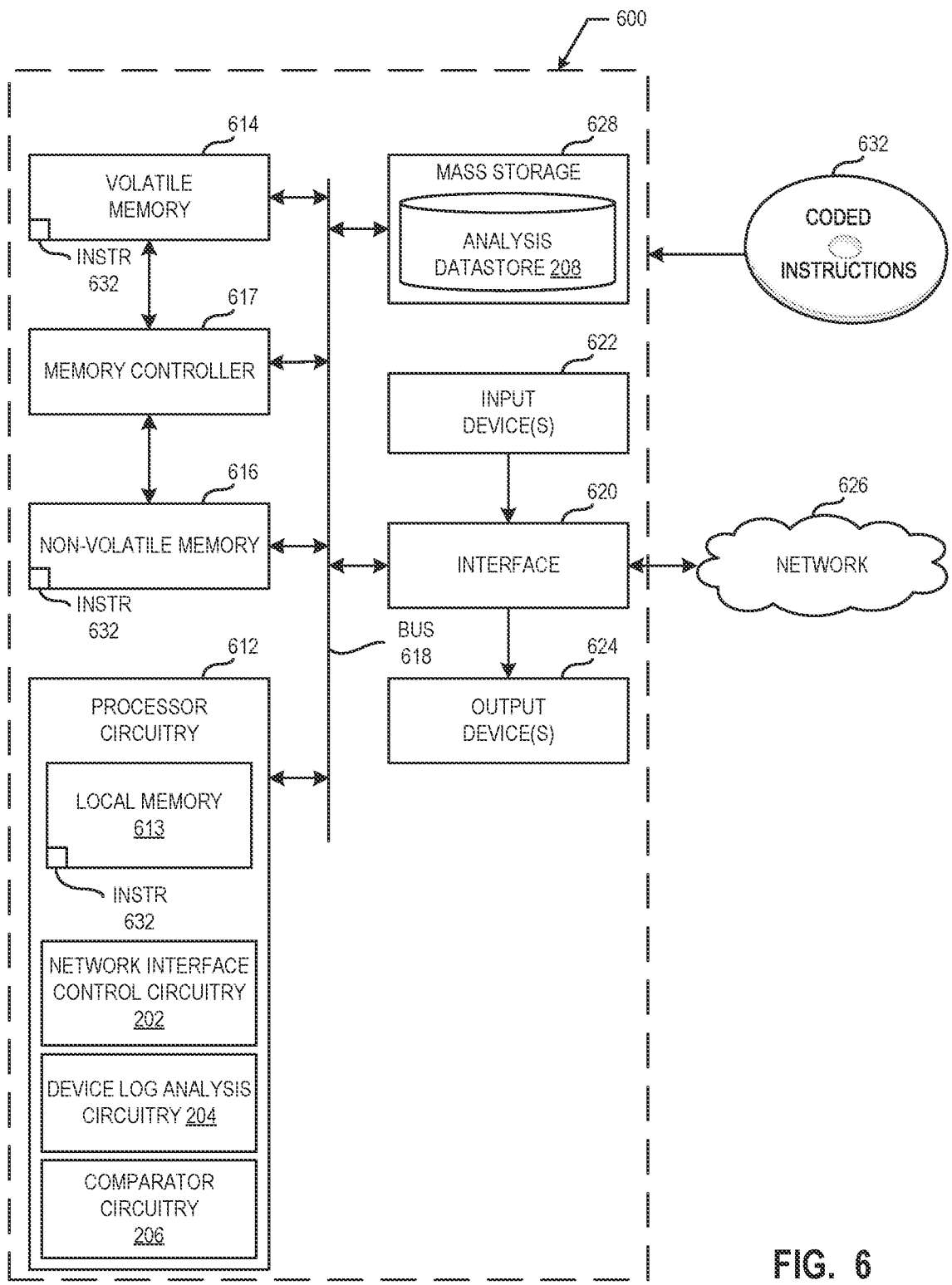
FIG. 6 is a block diagram of an example processing platform including processor circuitry structured to execute the example machine readable instructions and/or the example operations of FIG. 5 to implement the central facility of FIGS. 1 and/or 2.

FIG. 6 is a block diagram of an example processor platform 600 structured to execute and/or instantiate the machine readable instructions and/or the operations 500 of FIG. 5 to implement the central facility 118 of FIGS. 1 and/or 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs, microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example network interface control circuitry 202, the example device detection log analysis circuitry 204, and the example comparator circuitry 206.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storages 628 implement the example analysis datastore 208.

The machine readable instructions 632, which may be implemented by the machine readable instructions and/or the operations 500 of FIG. 5, may be stored in the mass storage device 628, in the volatile memory 614, in the non-volatile memory 616, and/or on a removable non-transitory computer readable storage medium such as a CD or DVD.

Figure 7:
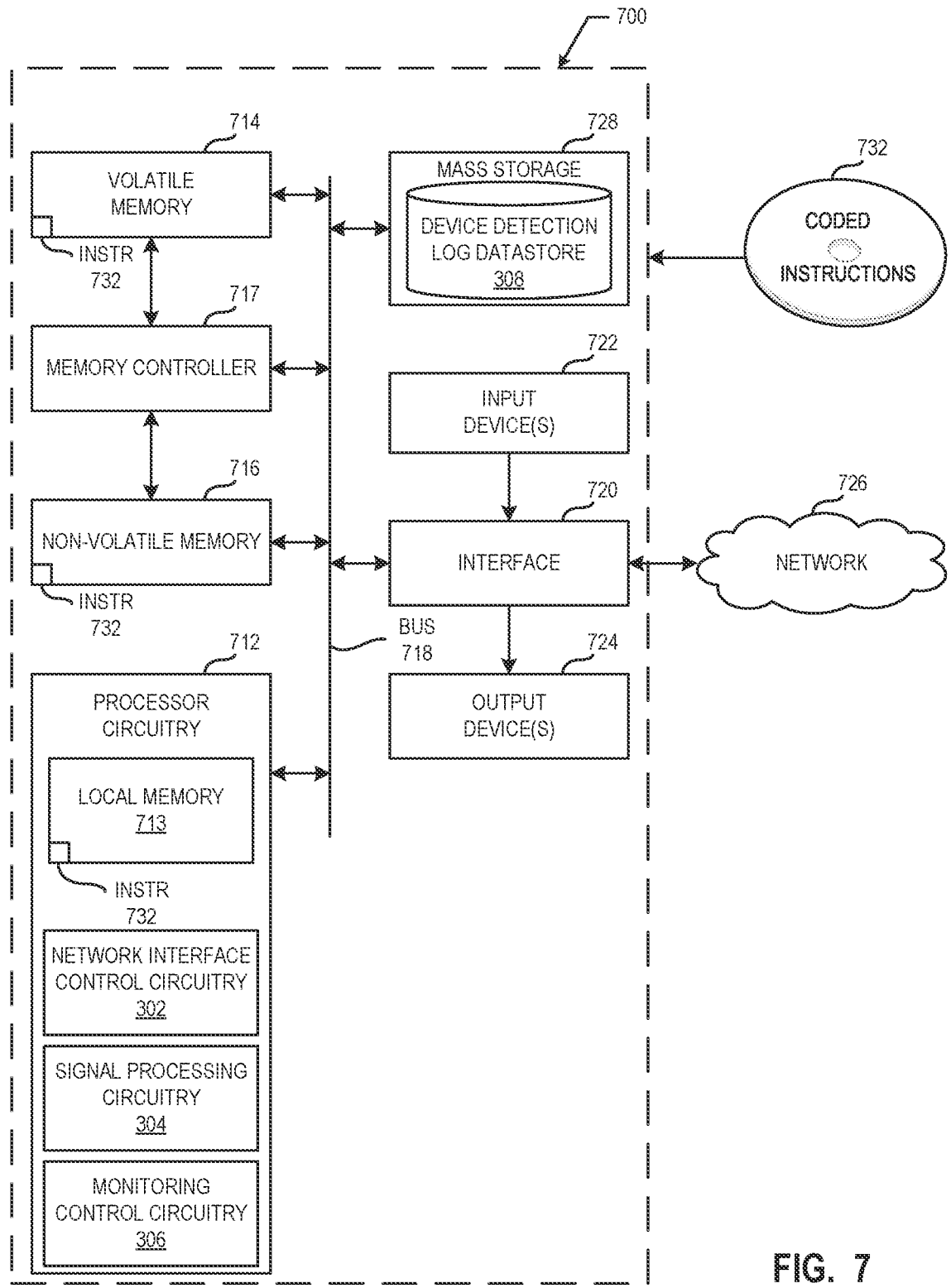
FIG. 7 is a block diagram of an example processing platform including processor circuitry structured to execute the example machine readable instructions and/or the example operations of FIG. 4 to implement the colocation monitoring circuitry of FIGS. 1 and/or 3.

FIG. 7 is a block diagram of an example processor platform 700 structured to execute and/or instantiate the machine readable instructions and/or the operations 400 of FIG. 4 to implement the colocation monitoring circuitry 126 of FIGS. 1 and/or 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example network interface control circuitry 302, the example signal processing circuitry 304, and the example monitoring control circuitry 306.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 728 implement the example device detection log datastore 308.

The machine readable instructions 732, which may be implemented by the machine readable instructions and/or the operations 400 of FIG. 4, may be stored in the mass storage device 728, in the volatile memory 714, in the non-volatile memory 716, and/or on a removable non-transitory computer readable storage medium such as a CD or DVD.

Figure 8:
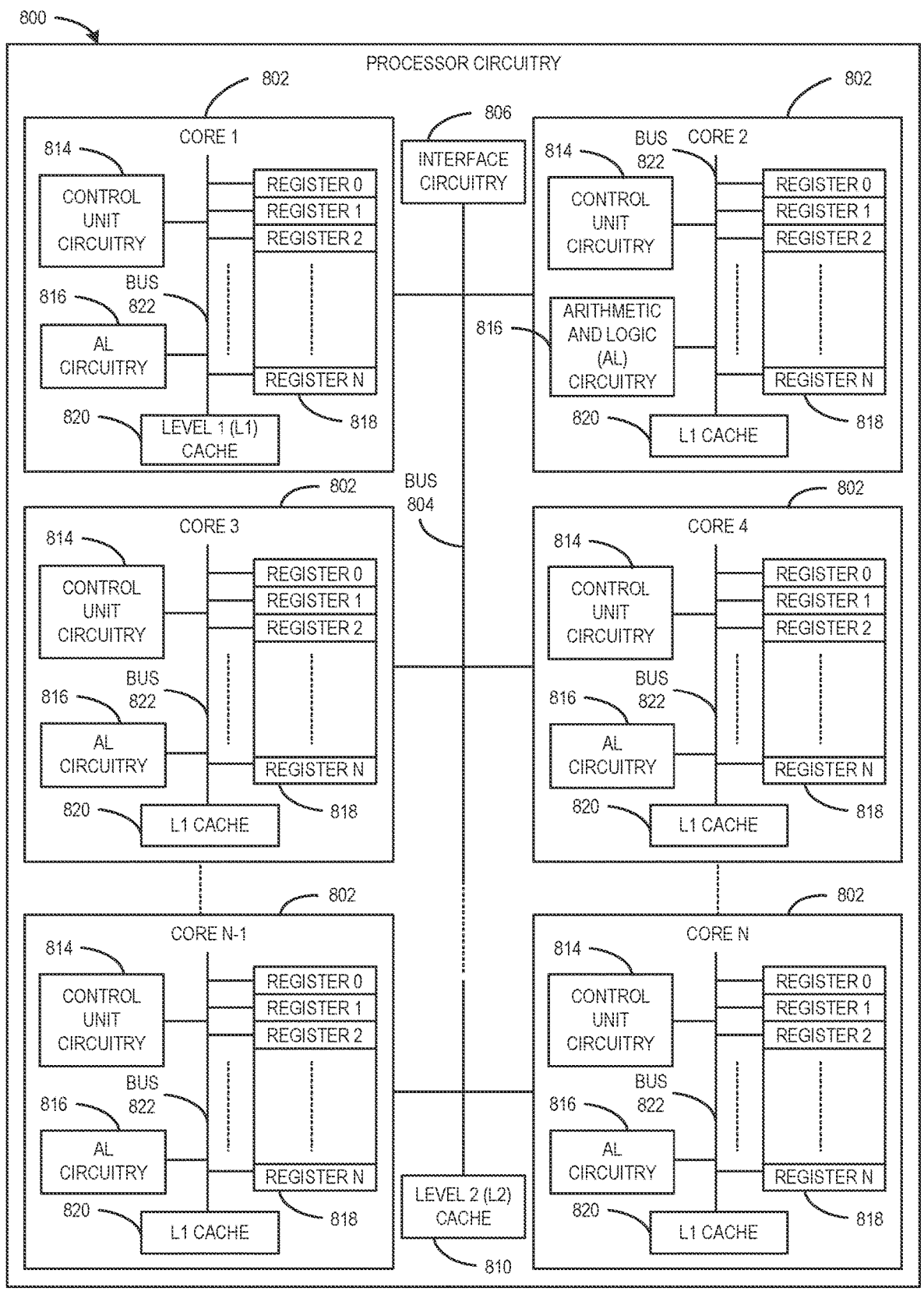
FIG. 8 is a block diagram of an example implementation of the processor circuitry of FIG. 6 and/or the processor circuitry of FIG. 7.

FIG. 8 is a block diagram of an example implementation of the processor circuitry 612 of FIG. 6 and/or the processor circuitry 712 of FIG. 7. In this example, the processor circuitry 612 of FIG. 6 and/or the processor circuitry 712 of FIG. 7 is implemented by a microprocessor 800. For example, the microprocessor 800 may be a general purpose microprocessor (e.g., general purpose microprocessor circuitry). The microprocessor 800 executes some or all of the machine readable instructions of the flowchart of FIG. 4 to effectively instantiate the circuitry of FIG. 3 and/or some or all of the machine readable instructions of the flowchart of FIG. 5 to effectively instantiate the circuitry of FIG. 2 as logic circuits to perform the operations corresponding to those machine readable instructions (e.g., to perform operations corresponding to instructions). In some such examples, the circuitry of FIGS. 2 and/or 3 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 4 and/or 5.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 614, 616 of FIG. 6 and/or the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control data movement (e.g., coordinate data movement) within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). In some examples, arithmetic and logic circuitry and arithmetic and logic unit are used interchangeably. The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
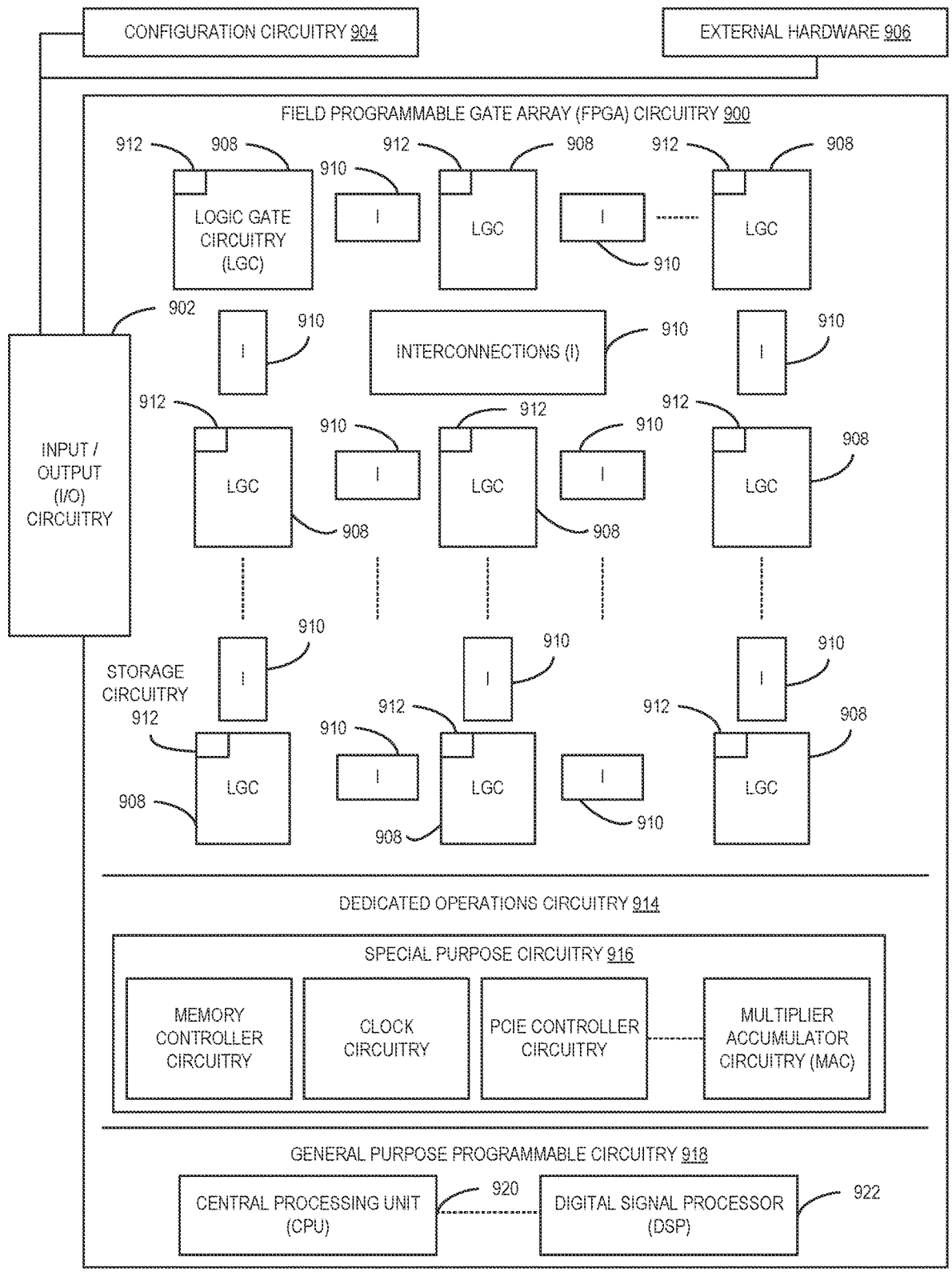
FIG. 9 is a block diagram of another example implementation of the processor circuitry of FIG. 6 and/or the processor circuitry of FIG. 7.

FIG. 9 is a block diagram of another example implementation of the processor circuitry 612 of FIG. 6 and/or the processor circuitry 712 of FIG. 7. In this example, the processor circuitry 612 and/or the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 4 and/or 5 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 4 and/or 5. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 4 and/or 5. As such, the FPGA circuitry 900 may be structured to effectively instantiate some or all of the machine readable instructions of the flowcharts of FIGS. 4 and/or 5 as dedicated logic circuits to perform the operations corresponding to those software instructions (e.g., to perform operations corresponding to instructions) in a dedicated manner analogous to an ASIC. Therefore, the FPGA circuitry 900 may perform the operations corresponding to the some or all of the machine readable instructions of FIGS. 4 and/or 5 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine readable instructions of FIGS. 4 and/or 5 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 612 of FIG. 6 and/or the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 612 of FIG. 6 and/or the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 4 and/or 5 may be executed by one or more of the cores 802 of FIG. 8, a second portion of the machine readable instructions represented by the flowcharts of FIGS. 4 and/or 5 may be executed by the FPGA circuitry 900 of FIG. 9, and/or a third portion of the machine readable instructions represented by the flowcharts of FIGS. 4 and/or 5 may be executed by an ASIC. It should be understood that some or all of the circuitry of FIGS. 2 and/or 3 may, thus, be instantiated at the same or different times. Some or all of the circuitry may be instantiated, for example, in one or more threads executing concurrently and/or in series. Moreover, in some examples, some or all of the circuitry of FIGS. 2 and/or 3 may be implemented within one or more virtual machines and/or containers executing on the microprocessor.

In some examples, the processor circuitry 612 of FIG. 6 and/or the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 612 of FIG. 6 and/or the processor circuitry 712 of FIG. 7, which may be in one or more packages. For example, the XPU may include a CPU in one package, a DSP in another package, a GPU in yet another package, and an FPGA in still yet another package.

Figure 10:
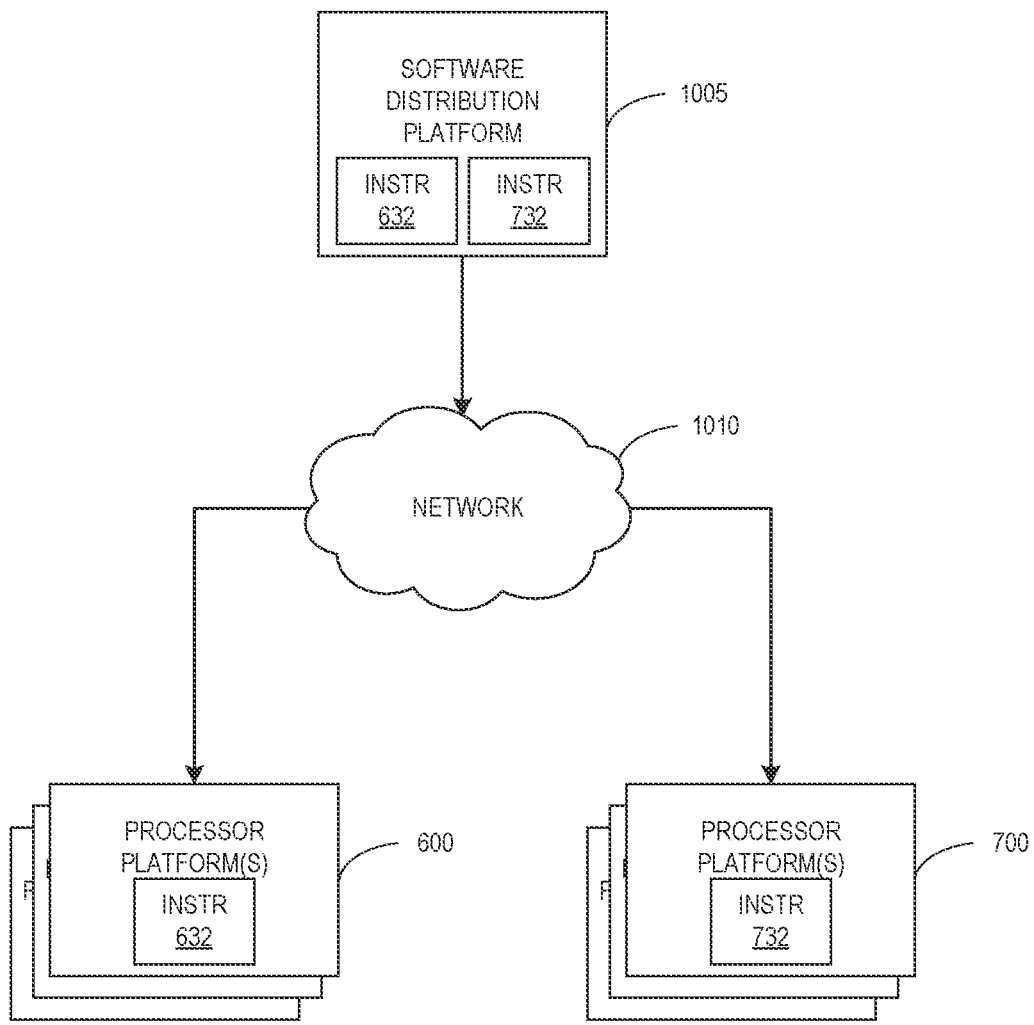
FIG. 10 is a block diagram of an example software distribution platform (e.g., one or more servers) to distribute software (e.g., software corresponding to the example machine readable instructions of FIGS. 4 and/or 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 632 of FIG. 6 and/or the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 632 of FIG. 6 and/or the example machine readable instruction 732 of FIG. 7. The third parties may be consumers, users, retailers, OEMs, etc., who purchase and/or license the software for use and/or re-sale and/or sub-licensing.

In the illustrated example of FIG. 10, the software distribution platform 1005 includes one or more servers and one or more storage devices. The storage devices store the machine readable instructions 632, which may correspond to the example machine readable instructions and/or the example operations 500 of FIG. 5, and/or the machine readable instructions 732, which may correspond to the example machine readable instructions and/or the example operations 400 of FIG. 4, as described above. The one or more servers of the example software distribution platform 1005 are in communication with an example network 1010, which may correspond to any one or more of the Internet and/or any of the example network 122, the example network 626, and/or the example network 726 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity.

In the illustrated example of FIG. 10, the servers enable purchasers and/or licensors to download the machine readable instructions 632 and/or the machine readable instructions 732 from the software distribution platform 1005. For example, the software, which may correspond to the example machine readable instructions and/or the example operations 500 of FIG. 5, may be downloaded to the example processor platform 600, which is to execute the machine readable instructions 632 to implement the central facility 118 of FIGS. 1 and/or 2. Additionally or alternatively, the software, which may correspond to the example machine readable instructions and/or the example operations 400 of FIG. 4, may be downloaded to the example processor platform 700, which is to execute the machine readable instructions 732 to implement the colocation monitoring circuitry 126 of FIGS. 1 and/or 3. In some examples, one or more servers of the software distribution platform 1005 periodically offer, transmit, and/or force updates to the software (e.g., the example machine readable instructions 632 of FIG. 6 and/or the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that determine whether audience measurement meters are co-located. Example systems, methods, apparatus, and articles of manufacture disclosed herein improve the accuracy and integrity of data collected by audience measurement meters. For example, by detecting instances of duplicate wear, examples disclosed herein identify audience measurement data that is likely inaccurate and excludes such data from the derivation of audience measurement metrics. Disclosed systems, methods, apparatus, and articles of manufacture improve the efficiency of using a computing device by avoiding subsequent processing of audience measurement metrics to correct for the inaccuracies associated duplicate wear by excluding audience measurement data generated by co-located audience measurement meters prior to the derivation of the audience measurement metrics. Disclosed systems, methods, apparatus, and articles of manufacture are accordingly directed to one or more improvement(s) in the operation of a machine such as a computer or other electronic and/or mechanical device.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to determine whether audience measurement meters are co-located, the apparatus comprising:
   at least one memory;
   machine readable instructions; and
   processor circuitry to at least one of instantiate or execute the machine readable instructions to:
      based on a difference between a first sampling time of a first entry of a first log and a second sampling time of a corresponding entry of a second log satisfying a first threshold, determine at least one matching instance of at least one first device identifier of the first entry and at least one second device identifier of the corresponding entry;
      populate a variable with the at least one matching instance, the variable corresponding to a first meter and a second meter; and
      based on a metric satisfying a second threshold, cause transmission of an alert indicating that the first meter and the second meter were co-located during generation of the first log and the second log, the metric based on the at least one matching instance.

2. The apparatus of claim 1, wherein the first log includes entries having:
   respective sampling times indicative of respective monitoring intervals; and respective device identifiers of at least one radio frequency device detected by the first meter during the respective monitoring intervals.

3. The apparatus of claim 2, wherein the at least one radio frequency device includes at least one Bluetooth® Low Energy device.

4. The apparatus of claim 1, wherein to determine the at least one matching instance of the at least one first device identifier and the at least one second device identifier, the processor circuitry is to at least one of:
execute a hidden Markov model on the at least one first device identifier and the at least one second device identifier; or
execute a string comparison algorithm on the at least one first device identifier and the at least one second device identifier.

5. The apparatus of claim 1, wherein at least one of the first threshold or the second threshold is trained using artificial intelligence.

6. The apparatus of claim 1, wherein the first log includes data collected over a period of time satisfying a third threshold, the third threshold corresponding to an amount of time sufficient to accurately determine that the first meter and the second meter were co-located during the generation of the first log and the second log.

7. The apparatus of claim 1, wherein the alert is to indicate that audience measurement data generated by the first meter and the second meter should be disregarded for at least a period of time corresponding to the generation of the first log and the second log.

8. A non-transitory machine readable storage medium comprising instructions that, when executed, cause processor circuitry to at least:
based on a difference between a first sampling time of a first entry of a first log and a second sampling time of a corresponding entry of a second log satisfying a first threshold, determine at least one matching instance of at least one first device identifier of the first entry and at least one second device identifier of the corresponding entry;
populate a variable with the at least one matching instance, the variable corresponding to a first meter and a second meter; and
based on a metric satisfying a second threshold, cause transmission of an alert indicating that the first meter and the second meter were co-located during generation of the first log and the second log, the metric based on the at least one matching instance.

9. The non-transitory machine readable storage medium of claim 8, wherein the first log includes entries having:
respective sampling times indicative of respective monitoring intervals; and
respective device identifiers of at least one radio frequency device detected by the first meter during the respective monitoring intervals.

10. The non-transitory machine readable storage medium of claim 9, wherein the at least one radio frequency device includes at least one Bluetooth® Low Energy device.

11. The non-transitory machine readable storage medium of claim 8, wherein to determine the at least one matching instance of the at least one first device identifier and the at least one second device identifier, the instructions cause the processor circuitry to at least one of:
execute a hidden Markov model on the at least one first device identifier and the at least one second device identifier; or
execute a string comparison algorithm on the at least one first device identifier and the at least one second device identifier.

12. The non-transitory machine readable storage medium of claim 8, wherein at least one of the first threshold or the second threshold is trained using artificial intelligence.

13. The non-transitory machine readable storage medium of claim 8, wherein the first log includes data collected over a period of time satisfying a third threshold, the third threshold corresponding to an amount of time sufficient to accurately determine that the first meter and the second meter were co-located during the generation of the first log and the second log.

14. The non-transitory machine readable storage medium of claim 8, wherein the alert is to indicate that audience measurement data generated by the first meter and the second meter should be disregarded for at least a period of time corresponding to the generation of the first log and the second log.

15. A method to determine whether audience measurement meters are co-located, the method comprising
based on a difference between a first sampling time of a first entry of a first log and a second sampling time of a corresponding entry of a second log satisfying a first threshold, determining, by executing an instruction with processor circuitry, at least one matching instance of at least one first device identifier of the first entry and at least one second device identifier of the corresponding entry;
populating, by executing an instruction with the processor circuitry, a variable with the at least one matching instance, the variable corresponding to a first meter and a second meter; and
based on a metric satisfying a second threshold, transmitting an alert indicating that the first meter and the second meter were co-located during generation of the first log and the second log, the metric based on the at least one matching instance.

16. The method of claim 15, wherein the first log includes entries having:
respective sampling times indicative of respective monitoring intervals; and
respective device identifiers of at least one radio frequency device detected by the first meter during the respective monitoring intervals.

17. The method of claim 16, wherein the at least one radio frequency device includes at least one Bluetooth® Low Energy device.

18. The method of claim 15, determining the at least one matching instance of the at least one first device identifier and the at least one second device identifier includes at least one of:
executing a hidden Markov model on the at least one first device identifier and the at least one second device identifier; or
executing a string comparison algorithm on the at least one first device identifier and the at least one second device identifier.

19. The method of claim 15, wherein at least one of the first threshold or the second threshold is trained using artificial intelligence.

20. The method of claim 15, wherein the first log includes data collected over a period of time satisfying a third threshold, the third threshold corresponding to an amount of time sufficient to accurately determine that the first meter and the second meter were co-located during the generation of the first log and the second log.

* * * * *